May 17, 1966 M. C. CONSTANT ETAL 3,251,983

MEANS FOR READILY DOUBLING OR HALVING CONTENTS OF REGISTER STAGES

Filed June 21, 1962

4 Sheets-Sheet 1

| +1 | x2 | :2 |
|---|---|---|
| 0→01;05→15 | 0→00;05→05 | 0→00(50);05→058 (268) |
| 1→02;15→25 | 1→02;15→25 | 1→01(51);06→059 (269) |
| 2→03;25→35 | 2→04;25→45 | 2→10(60);15→ 68 (358) |
| 3→04;35→45 | 3→06;35→16 | 3→11(61);16→ 69 (559) |
| 4→05;45→06 | 4→08;45→36 | 4→20(70);25→158 (368) |
| 5→06;06→16 | 5→10;06→057 | 5→21(71);26→159 (369) |
| 6→07;16→26 | 6→12;16→257 | 6→30(80);35→168 (458) |
| 7→08;26→36 | 7→14;26→457 | 7→31(81);36→169 (459) |
| 8→09;36→46 | 8→16;36→167 | 8→40(90);45→258 (468) |
| 9→10;46→057 | 9→18;46→367 | 9→41(91);46→259 (469) |

INVENTOR
MAURICE C. CONSTANT
SERGE SABOULARD
BY
Frank R. Jrifari
AGENT

INVENTOR
MAURICE C. CONSTANT
SERGE SABOULARD
BY
[signature]
AGENT

INVENTOR
MAURICE C. CONSTANT
SERGE SABOULARD
BY
AGENT

INVENTOR
MAURICE C. CONSTANT
SERGE SABOULARD
BY
Frank R. Trifari
AGENT

United States Patent Office 3,251,983
Patented May 17, 1966

3,251,983

MEANS FOR READILY DOUBLING OR HALVING CONTENTS OF REGISTER STAGES

Maurice Charles Constant, La Varenne, and Serge Saboulard, Buisson, France, assignors to North American Philips Company Inc., New York, N.Y., a corporation of Delaware Filed June 21, 1962, Ser. No. 204,236
Claims priority, application France, June 23, 1961, 865,927; July 12, 1961, 867,835
4 Claims. (Cl. 235—159)

This invention relates to means for performing calculations with decimal digits in biquinary code form. The calculations are performed in conjunction with register stages corresponding to one digit position and comprises bistable cold cathode tubes connected as cathode followers, each having at least one firing or igniting electrode causing the tube to assume either a nonconducting state or a conducting state, hereinafter referred to as the ignited state or condition. Each register stage stores a decimal digit in the form of a biquinary code which has seven code-element positions per code group; these code-element positions may be divided into a quinary group and a binary group, each code-element position corresponding to a group of one or more tubes.

It is, of course, known how to unite a plurality of register stages into a register having an arbitrary number of digit positions. For various types of calculations desirable to have available a register in which the stored number may be doubled or halved without the intermediary of other members. Examples of calculations for which such a register may be useful are: writing a decimally coded number in binary coded form; writing a binary coded number in decimally coded form; and multiplying two numbers by the duplation method (see Richards: Arithmetic Operations in Digital Computers, pages 267, 268).

A primary object of the invention is to render a register stage of the above-mentioned type readily suitable for multiplication by 2 or division by 2.

According to one aspect of the invention, the digit stored in the register stage is doubled or halved if a pulse is applied to at least one particular input terminal. Cold-cathode tubes are used to form a register storing a decimal digit in a biquinary code. This is a two-out-of-seven code having a binary group and a quinary group of code-element positions or bits. For both doubling and halving, the quinary group includes one cold-cathode tube for each code element position. For doubling, the binary group includes three cold-cathode tubes connected in parallel for one code-element position and two cold-cathode tubes connected in parallel for the other code-element position. For halving, the binary group also includes three cold-cathode tubes connected in parallel for one code-element position, but three tubes connected in parallel for the other code-element position. The cathodes of the tubes comprising the two code-element positions of the binary groups are capacitively coupled to each other, and the cathode of each of the tubes in the quinary group is coupled to one or more of the igniting electrodes of the tubes in the binary group.

The above object and aspects of the invention, together with other features thereof, will be better understood from the following detailed description of a preferred embodiment, taken in conjunction with the accompanying drawing, wherein.

Figures 1, 2:
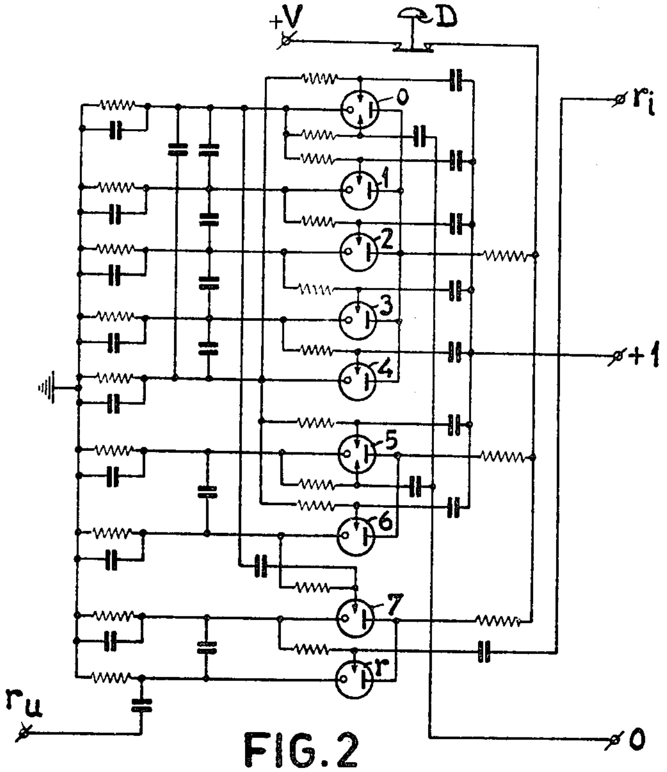
FIGURE 1 shows a table of the variations which must occur in a register stage if the digit stored therein is increased by 1, multiplied by 2 (doubled), or divided by 2 (halved)
FIGURE 2 shows the diagram of a register stage of a register in which the stored digit may be increased by 1.

FIGURE 1 illustrates numerically the required code positions for corresponding arithmetic changes and shows the variation which must occur in a register stage if the number stored in the register is increased by 1, multiplied by 2, or divided by 2. The left-hand column (+1) shows the variation occurring on an increase by 1, the middle column (×2) shows the variation on a multiplication by 2, and the right-hand column shows the variation on a division by 2. Let us first consider the most left-hand column relating to the increase by 1. It will be evident that the variation consists in that the digit "0" must be replaced by the digit "1," the digit "1" by the digit "2," etc. This is shown in the table by the designations 0→01, 1→02, etc. The "0" in the second term of these designations means that the register stage must deliver a carry "0" to the register stage at the digit position which is one higher. The designation 9→10 means that the digit "9" must be changed to the digit "0" and that the register stage must deliver a carry "1" to the register stage at the digit position which is one higher.

For coding the digits, the following so-called biquinary code is used:

| | |
|---|---|
| 0=1000010 | 5=1000001 |
| 1=0100010 | 6=0100001 |
| 2=0010010 | 7=0010001 |
| 3=0001010 | 8=0001001 |
| 4=0000110 | 9=0000101 |

This code has seven code-element positions which are numbered from the left to the right: 0, 1, 2, 3, 4, 5 and 6. The code-element positions 0, 1, 2, 3 and 4 form together the group of quinary code-element positions and the code-element positions 5 and 6 form together the group of binary code-element positions. The code is also 2-out-of-7 code and as such self-checking. The code group 1000010, of which only the code elements or tubes at the code-element positions 0 and 5 are in the ignited condition and have the value "1," is indicated in abbreviated form by the symbol 05; the code group 0100010, of which only the code elements at the code-element positions 1 and 5 have the value "1," is indicated in abbreviated form by the symbol 15, etc. The designation 25→35 next to the designation 2→03 in FIGURE 1, means that the code group 25=0010010, corresponding to the digit 2, must be changed to the code group 35=0001010, corresponding to the digit 3. The notations in the middle and right-hand columns of FIGURE 1 will be further explained below.

FIGURE 2 shows a circuit arrangement built up of cold-cathode tubes and capable of carrying out the increase by 1 as indicated in the left-hand column of FIGURE 1. The circuit comprises nine cold-cathode tubes 0, 1, 2, 3, 4, 5, 6, 7 and *r* which are connected between a positive source +V and ground in the manner shown. The tubes 0, 1, . . ., 6 correspond to the respective code-element positions of the biquinary code. If the code element at a given code-element position has the value "0" the corresponding cold-cathode tube is not ignited, and if the code-element at this code-element position has the value "1" this tube is ignited.

The anodes of the group of tubes 0, 1, 2, 3, 4, of the group of tubes 5, 6 and of the group of tubes 7, *r* are respectively connected to the voltage source +V through a common resistor for each group. The cathodes of the tubes 0, 1 2, 3, 4, 5, 6 and 7 are individually connected to ground through a parallel resistor-capacitor combination, the cathode of tube *r* being grounded through a resistor only. The circuit also includes three input terminals 0, +1 and $r_1$, and an output terminal $r_u$. Each of the three input termials is connected throught a capaictor to igniting eletrodes of a plurality of tubes in a manner which can be clearly seen in the figure and will be explained more fully hereinafter. The output terminal $r_u$ is connected via a capacitor to the cathode of tube *r*. The tubes are otherwise connected in a conventional manner such that in each of the three groups of tubes 0, 1, 2, 3, 4 and 5, 6 and 7, *r* only one tube at a time may be ignited. The ignition of a tube in each of the three groups of tubes may be effected by applying a positive pulse to an igniting electrode of the relevant tube, but this has the effect of extinguishing all the other tubes in this group which may already have been ignited. This object is attained in known manner in FIGURE 2 by coupling together the cathodes of all the tubes of the same group through capacitors. In certain cases, the resistors may be so proportioned that the capacitors are not necessary.

The circuit arrangement operates as follows. When a button D is momentarily depressed all the tubes are extinguished since their source of power is disconnected. The assembly is so proportioned that none of the tubes is ignited again automatically when the button D is released. If, now, a positive pulse of sufficient magnitude is applied to the input terminal 0, the tubes 0 and 5 are ignited, so that the register stage contains the code group 1000010 corresponding to the digit "0." The input terminal 0 thus serves to adjust the register to "0" after the button D has first been momentarily depressed. Let it further be assumed that the register stage is adjusted to the digit "3," corresponding to the code group 0001010, in which case only the tubes 3 and 5 are ignited. In this case the cathode of tube 3 has a high potential which is transferred through a resistor to an igniting electrode of tube 4. The cathode of tube 5 now also has a high potential, but this has no further effect. If, now, a positive pulse is applied to the terminal +1, all the tubes 0, 1, 2, 3, 4, 5 and 6 receive a positive pulse at one of their igniting electrodes. Only tube 4 ignites, however, since the igniting electrode of this tube has a high potential due to tube 3 being ignited. Thus, an increase in potential occurs at the cathode of said tube which is transferred through a capacitor as a positive pulse to the cathode of tube 3, which tube thus extinguishes. The register stage now contains the code group 0000110 corresponding to the digit "4." Since tube 4 is now ignited, the cathode of tube 4 has a high potential which is applied through a resistor to igniting electrodes of the tubes 0, 5 and 6. If a positive pulse is again applied to the terminal +1, the tubes 0 and 6 ignite (tube 5 was already ignited). However, the resulting increase in potential set up at the cathode of tube 0 is applied through a capacitor as a positive pulse to the cathode of tube 4, which tube thus extinguishes. Similarly, the increase in potential set up at the cathode of tube 6 is applied through a capacitor as a positive pulse to the cathode of tube 5, which tube likewise extinguishes. The final result is that the register now contains the code group 1000001 corresponding to the digit "5." The operation of the circuit may be followed step by step. It should be mentioned only that if the digit 9 is stored in the register stage (tubes 4 and 6 ignited), the application of a positive pulse to the terminal +1 results in the tubes 0 and 5 being ignited and the tubes 4 and 6 extinguishing. Since the voltage at the cathode of tube 0 suddenly increases, a positive pulse is applied to an igniting electrode of tube 7, which igniting electrode is connected through a resistor to the cathode of tube 6. This results in tube 7 also being ignited. The register now contains the code group 1000010 corresponding to the digit "0." The fact that tube 7 is ignited means that a carry "1" must be passed to the register stage at the next higher digit position. This is effected by applying a pulse to the terminal $r_1$, resulting in tube *r* being ignited and tube 7 extinguishing. The increase in potential at the cathode of tube *r* now appears as a positive pulse at the output terminal $r_u$ since this terminal is connected through a capacitor to the cathode of tube *r*. It will otherwise be evident that the ignition of tube 0 results in ignition of tube 7 only if tube 6 was ignited shortly before. Furthermore tube *r* may be ignited only if tube 7 was already ignited, so that the latter tube initiates the transfer of a carry which is effected by applying a pulse to the input terminal $r_1$.

Figure 3:
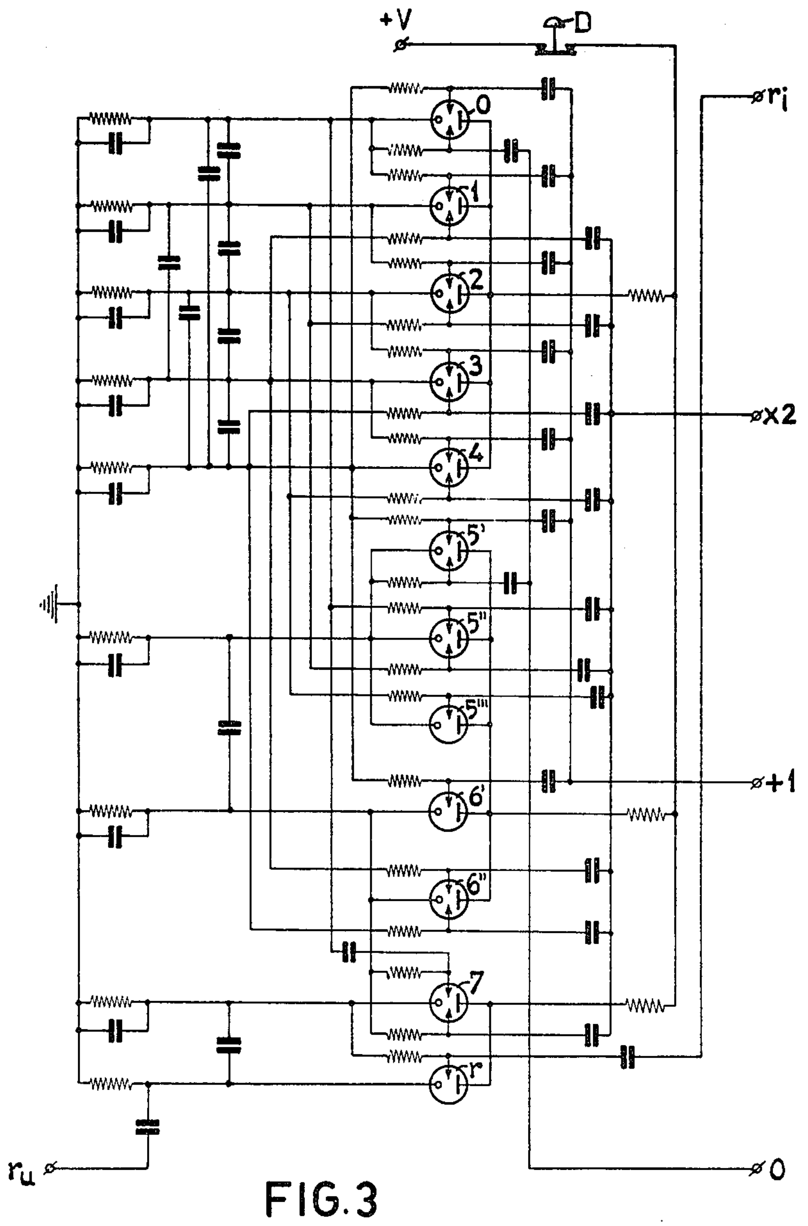
FIGURE 3 shows the diagram of a register stage of a register in which the stored digit may be multiplied by 2.

The second column of FIGURE 1 shows the variations which must occur in a register stage if the number stored in the register is multiplied by 2, use being made of the same code and the same notation as in the first column of FIGURE 1. FIGURE 3 shows the circuit of a register stage which may carry out this procedure, as well as the procedure described above with reference to FIGURE 2. Thus the circuit of FIGURE 2 is contained in FIGURE 3. For the multiplication by 2, the tube 5 is now connected parallel to two other tubes so that there are three tubes 5 as indicated by 5', 5'' and 5'''. Also another tube is connected parallel to tube 6 so that there are two tubes 6 as indicated by 6' and 6''.

The principle of operation of this circuit is analogous to that of the operation of the circuit shown in FIGURE 2. Let us consider, for example, the designation 6→12; 16→257 which expresses the condition that the code group 0100001 corresponding to the digit "6" (tubes 1 and 6 ignited) must change to the code group 0010010 (tubes 2 and 5 ignited) and that a carry "1" must be formed (tube 7 ignited). To achieve this, the cathode of tube 1 is connected through a resistor to an igniting electrode of tube 2. The igniting electrode itself is connected through a capacitor to the input terminal $x$2, and also through another resistor to an igniting electrode of one of the parallel-connected tubes 5, i.e., to an igniting electrode of the tube 5'', which igniting electrode itself is connected through a capacitor to the input terminal $x$2. If a positive pulse is applied to terminal $x$2 the tubes 2 and 5'' are ignited and tube 1 extinguishes; also, extinguishment occurs of one of the tubes 6' and 6'' which was ignited. It may also be seen from the second column of FIGURE 1 that in all cases where one of the tubes 6' and 6'' was ignited the tube 7 must be ignited after carrying out the operation $x$2. The interconnected cathodes of the tubes 6' and 6'' are therefore connected through a resistor to an igniting electrode of tube 7, the latter being also connected through a capacitor to the terminal $x$2. Thus, if a positive pulse is applied to terminal $x$2, tube 7 will be ignited in all cases where one of the tubes 6' and 6'' was ignited.

The third column of FIGURE 1 shows the variations which must occur in a register stage if the number stored in the register is to be divided by 2. However, it is now necessary to distinguish whether the digit at the digit position which is one higher was even or odd. Thus, for example, the digit "5" must be changed to "2" or "7," dependent upon whether the digit at the digit position which is one higher was even or odd. Also, the relevant register stage must signal to the register stage at the digit position which is one lower, whether the digit stored therein was even or odd.

For this reason it is practical to use a different biquinary code, that is to say the biquinary code:

| | |
|---|---|
| 0=1000010 | 5=0010001 |
| 1=1000001 | 6=0001010 |
| 2=0100010 | 7=0001001 |
| 3=0100001 | 8=0000110 |
| 4=0010010 | 9=0000101 |

However, the notation used in the right-hand column of FIGURE 1 is otherwise the same as used in the other columns. The formula 6→30(80); 35→168(459) for example now means the following: If the code group 0001010 corresponding to the digit "6" (tubes 3 and 5 ignited) is stored in the register stage it must be changed to the code group 0100001 corresponding to the digit "3" (tubes 1 and 6 ignited) if the digit at the digit position which is one higher is even, and changed to the code group 0000110 corresponding to the digit "8" (tubes 4 and 5 ignited) if the digit at the digit position which is one higher is odd; in either case it must be signalled to the register stage at the digit position which is one lower that the digit stored in the relevant register stage was even. The remaining designations in the third column of FIGURE 1 can be interpreted in an analogous manner.

Figure 4:
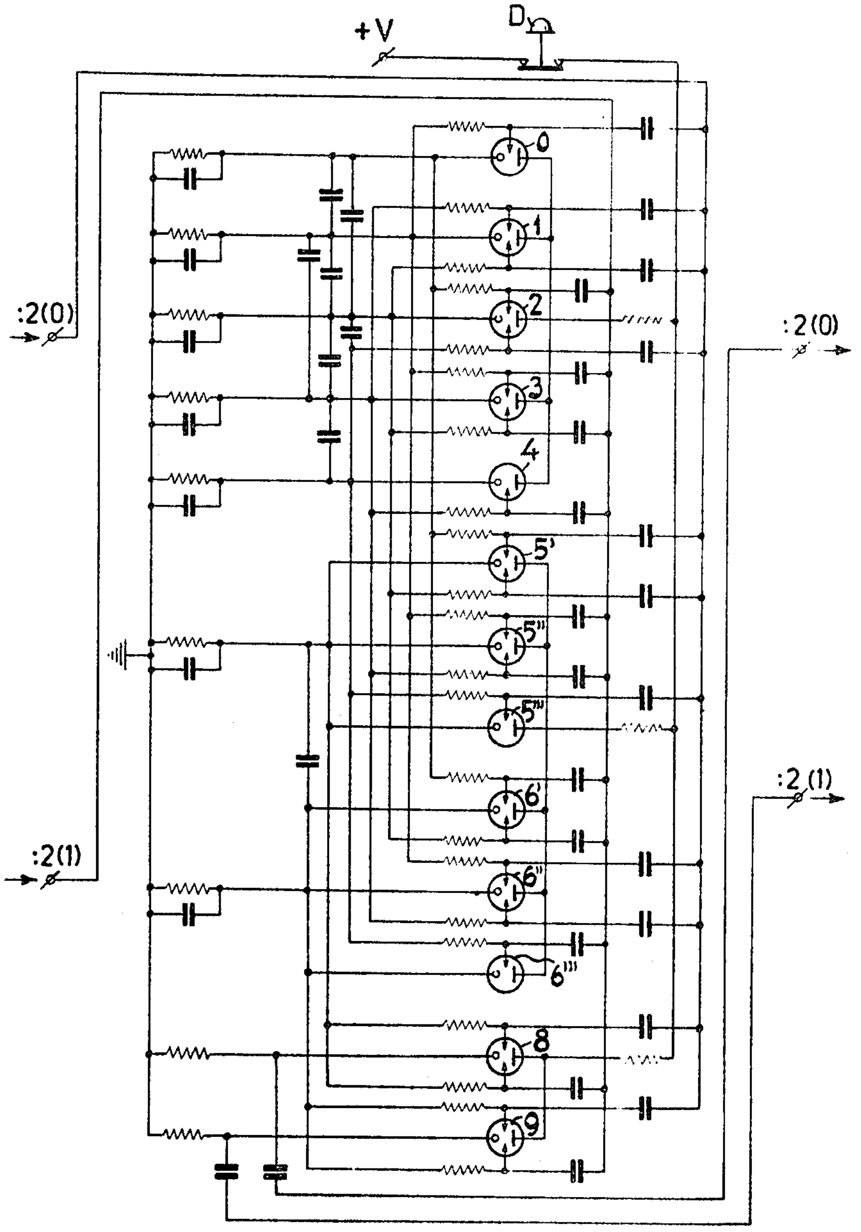
FIGURE 4 shows the diagram of a register stage of a register in which the stored digit may be divided by 2.

FIGURE 4 shows the circuit of a register stage for carrying out the halving operation. The register stage includes two input terminals :2(0) and :2(1). If a positive pulse is applied to the terminal :2(0) the digit stored in the register stage is divided by 2, making allowance for a partial rest 0 of the division at the digit position which is one higher. If a positive pulse is applied to the terminal :2(1) the digit stored in the register stage is divided by 2, making allowance for a partial rest 1 of the division at the digit position which is one higher (so that the digit stored in the register stage must be imagined to be increased by 10). The circuit also includes two output terminals :2(0) and :2(1). The pulse applied to the input terminal :2(0) or :2(1) is passed on to the output terminal :2(0) or :2(1), dependent upon whether the digit initially stored in the register stage is even or odd. The input terminals :2(0) and :2(1) are indicated by a common arrow pointing to wards these terminals and the output terminals :2(0) and :2(1) are indicated by an arrow pointing away from these terminals. Consider now the operation, for example, of the designation 7→31(81); 36→169(459). If the tube 3 and one of the tubes 6 are ignited and the circuit receives a positive pulse at its input terminal :2(0), the tubes 1 and 9 are ignited and tube 3 extinguishes, whereas tube 6 remains ignited. This is due to the tube 1 having an igniting electrode which is connected, first, through a capacitor to the input terminal :2(0) and, also through a resistor to the cathode of tube 3, while tube 9 has an igniting electrode which is connected, first through a capacitor to the input terminal :2(0) and, also through a resistor to the interconnected cathodes of the tubes 6′, 6″ and 6‴. Due to the ignition of tube 9, the output terminal :2(1) delivers a positive pulse. However, if a positive pulse is applied to the input terminal :2(1) the tubes 4, 5 and 9 are ignited for similar reasons as mentioned above. More particularly it appears that, independent of whether the input terminal :2(0) or the input terminal :2(1) receives a positive pulse, tube 8 is ignited if one of the tubes 5′, 5″ and 5‴ was previously ignited, and tube 9 is ignited if one of the tubes 6′, 6″ and 6‴ was previously ignited. In the first case, the digit initially stored in the register stage was even and the output terminal :2(0) delivers a positive output pulse. In the second case, the digit intially stored in the register stage was odd and the output terminal :2(1) delivers a positive output pulse.

From the foregoing it will be evident that the form which the circuit of a register stage assumes, and to a certain extent even the practical realisation thereof, is greatly dependent upon the code employed. Important is also the fact that 2 is a divider of the base number 10.

Figure 5:
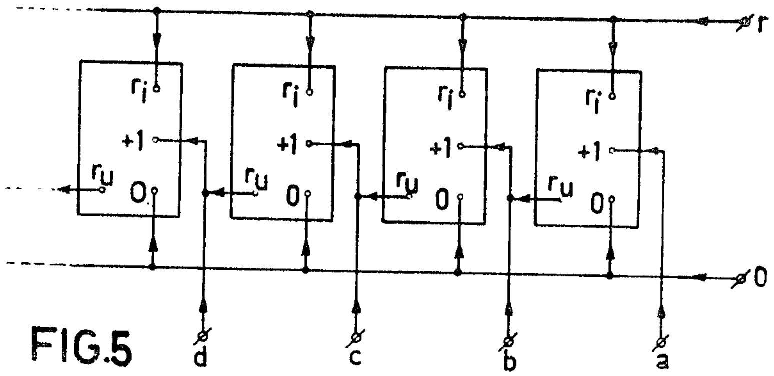
FIGURES 5, 6 and 7 show the manner in which the register stages of FIGURES 2, 3 and 4 may be combined into a register performing the combined functions.

FIGURE 5 shows the manner in which a plurality of register stages of the type shown in FIGURE 2 may be combined into a register. The register is adjustable by applying the correct numbers of pulses to the terminals *a*, *b*, *c*, *d*. . . . If, for example, it is desired to make the addition . . . 7340+ . . . 8194= . . . 5534, the register is first adjusted to "0" by pushing the button D which is common to all the register stages Then a first set of positive pulses having values of 0, 4, 3, 7 . . . are respectively applied to the terminals *a*, *b*, *c*, *d*, . . . so that the number . . . 7340 is registered in the register. Thereafter a second set of positive pulses having values of 4, 9, 1, 8 . . . are applied respectively to the terminals *a*, *b*, *c*, *d*, . . . so that the number . . . 5434 is registered in the register. At the same time, the carries thereby generated by the total of the first and second set of pulses are registered in several register stages (in this case those at the digit positions 1, 3, . . . ). If a positive pulse is applied to the terminal *r*, all the these carries are handled, but new carries may be formed by the application of this pulse. In order to be sure that no register stage any longer contains a carry, the number of pulses applied to the terminal *r* must be equal to the number of digit positions of the register.

Figure 6:
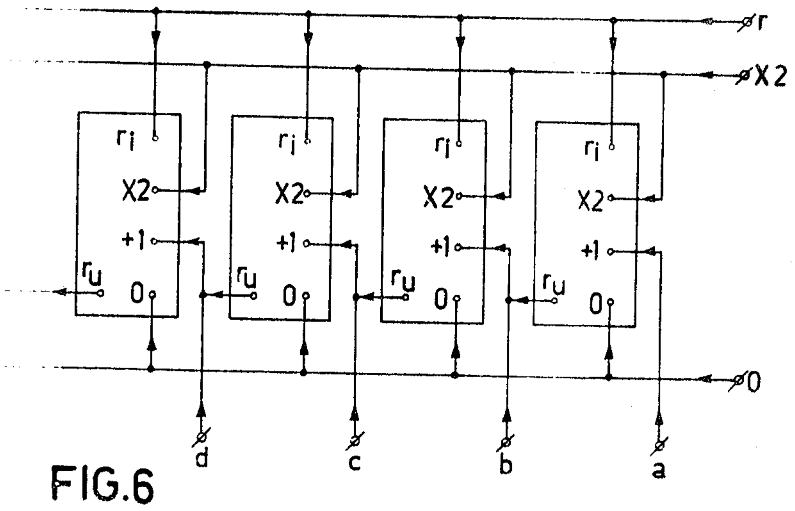

FIGURE 6 shows the manner in which a plurality of register stages of the kind shown in FIGURE 3 may be united into a register. If the number stored in the register must be multiplied by 2 a positive pulse is applied to the input terminals *x2* of all the register stages, whereafter any carries are handled again by applying a sufficient number of positive pulses to the terminal *r*.

Figure 7:
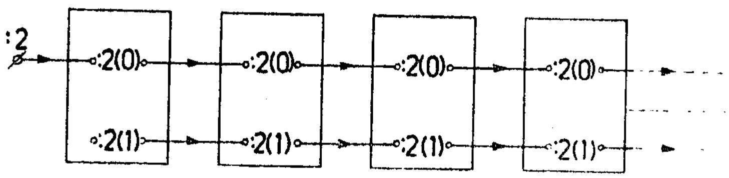

FIGURE 7 shows the manner in which a plurality of register stages of the kind shown in FIGURE 4 may be united into a register. To store a given number in the register, it is necessary to ignite two tubes in each register stage. This may be effected, for example, by applying sufficiently strong negative pulses to the cathodes of the relevant tubes. As may be seen from FIGURE 7, the register stages are now connected in series since the dividing process is carried out as a series-process. If a positive pulse is applied to the input terminal :2(0) of the register stage at the highest digit position the digit stored therein is divided by 2 and either the output terminal :2(0), or the output terminal :2(1) of this register stage delivers an output pulse, dependent upon whether the digit stored in it was even (rest "0") or odd (rest "1"). A division by 2 thus also took place in the register stage at the digit position which is one lower, allowance being made for the partial rest of the division at the highest digit position. This process is repeated until a division by 2 has taken place in all the register stages.

While various embodiments of the invention have been described above, it will be apparent to those skilled in the art that numerous modifications thereof are possible without departing from the invention concept, the scope of which is set forth in the appended claims.

What is claimed is:

1. A circuit arrangement for doubling the contents of a register stage corresponding to one digit position of a decimal number, said digit position being stored in said stage in the form of a biquinary code having seven code-element positions per code group, said code-element positions including a quinary group and a binary group, each code-element position of said quinary group being stored by a cold-cathode tube, one code-element position of said binary group being stored by a set of three cold-cathode tubes, the other code-element position of said binary group being stored by a set of two cold-cathode tubes, each cold-cathode tube having an anode, a cathode and at least one igniting electrode, the cathodes of said set of three tubes being connected together, the cathodes of said set of two tubes being connected together, the cathodes of the tubes in said quinary group being interconnected by means of a plurality of capacitors, the cathode of each tube in said quinary group being coupled to an igniting electrode of the next succeeding tube in said quinary group, the cathodes of said set of three tubes being connected to the cathodes of said set of two tubes by means of a capacitor, means for applying operating potential to all of said anodes, means for coupling the cathode of each of the tubes in said quinary group to at least one of the igniting electrodes of the tubes in said sets of two and three tubes, and an input terminal adapted to deliver an input pulse to at least one of the igniting electrodes of said tubes in said binary and quinary groups, said input pulse operating to double the contents of said stage.

2. A circuit arrangement for doubling the contents of a register stage corresponding to one digit position of a decimal number, said digit position being stored in said stage in the form of a biquinary code having seven code-element positions per code group, said code-element positions including a quinary group and a binary group, each code-element position of said quinary group being stored by a cold-cathode tube, one code-element position of said binary group being stored by a set of three cold-cathode tubes, the other code-element position of said binary group being stored by a set of two cold-cathode tubes, each cold-cathode tube having an anode, a cathode and at least one igniting electrode, the cathodes of said set of three tubes being connected together, the cathodes of said set of two tubes being connected together, the cathodes of the tubes in said quinary group being interconnected by means of a plurality of capacitors, the cathode of each tube in said quinary group being coupled to an igniting electrode of the next succeeding tube in said quinary group, the cathodes of said set of three tubes being connected to the cathodes of said set of two tubes by means of a capacitor, a carry group including two cold-cathode tubes each having a cathode, an anode and at least one igniting electrode, the cathode of one of the tubes in the carry group being coupled to an igniting electrode of the other tube, the cathode of said other tube being coupled to an output terminal, the cathodes of said set of two tubes being coupled to the igniting electrodes of said one tube, one of the igniting electrodes of said one tube being coupled to an igniting electrode of one tube of said set of three tubes, means for applying operating potential to all of said anodes, means for coupling the cathode of each of the tubes in said quinary group to at least one of the igniting electrodes of the tubes in said sets of two and three tubes, and an input terminal adapted to deliver an input pulse to at least one of the igniting electrodes of said tubes in said binary and quinary groups, said input pulse operating to double the contents of said stage and deliver a carry pulse to the next-succeeding stage at said output terminal.

3. A circuit arrangement for having the contents of a register stage corresponding to one digit position of a decimal number, said digit position being stored in said stage in the form of a biquinary code having seven code-element positions per code group, said code-element positions including a quinary group and a binary group, each code-element position of said quinary group being stored by a cold-cathode tube, one code-element position of said binary group being stored by a first set of three cold-cathode tubes, the other code-element position of said binary group being stored by a second set of three cold-cathode tubes, each cold-cathode tube having an anode, a cathode and at least one igniting electrode, the cathodes of said first set of three tubes being connected together, the cathodes of said second set of three tubes being connected together, the cathodes of the tubes in said quinary group being interconnected by means of a plurality of capacitors, the cathode of each tube in said quinary group being coupled to predetermined pairs of igniting electrodes of other tubes in said quinary group, the cathodes of said first set of three tubes being connected to the cathodes of said second set of three tubes by means of a capacitor, means for applying operating potential to all of said anodes, means for coupling the cathode of each of the tubes in said quinary group to at least one of the igniting electrodes of the tubes in said first and second sets, a first input terminal adapted to deliver an input pulse to a first predetermined plurality of igniting electrodes of said tubes in said binary and quinary groups, and a second input terminal adapted to deliver an input pulse to a second predetermined plurality of igniting electrodes of said tubes in said binary and quinary groups, said input pulses operating to halve the contents of said stage.

4. A circuit arrangement for halving the contents of a register stage corresponding to one digit position of a decimal number, said digit position being stored in said stage in the form of a biquinary code having seven code-element positions per code group, said code-element positions including a quinary group and a binary group, each code-element position of said quinary group being stored by a cold-cathode tube, one code-element position of said binary group being stored by a first set of three cold-cathode tubes, the other code-element position of said binary group being stored by a second set of three cold-cathode tubes, each cold-cathode tube having an anode, a cathode and at least one igniting electrode, the cathodes of said first set of three tubes being connected together, the cathodes of said second set of three tubes being connected together, the cathodes of the tubes in said quinary group being interconnected by means of a plurality of capacitors, the cathode of each tube in said quinary group being coupled to predetermined pairs of igniting electrodes of other tubes in said quinary group, the cathodes of said first set of three tubes being connected to the cathodes of said second set of three tubes by means of a capacitor, a group of output tubes including two cold-cathode tubes each having an anode, a cathode and at least one igniting electrode, the igniting electrodes of one of said output tubes being coupled to all the cathodes of both sets of three tubes, the igniting electrodes of the other output tube being coupled to all the cathodes of one set of three tubes, the cathodes of said output tubes being coupled to separate output terminals, means for applying operating potential to all of said anodes, means for coupling the cathode of each of the tubes in said quinary group to at least one of the igniting electrodes of the tubes in said first and second sets, a first input terminal adapted to deliver an input pulse to a first predetermined plurality of igniting electrodes of said tubes in said binary and quinary groups, and a second input terminal adapted to deliver an input pulse to a second predetermined plurality of igniting electrodes of said tubes in said binary and quinary groups, said input pulse operating to halve the contents of said stage and selectively deliver an output pulse at one of said output terminals depending on the initial contents of said stage.

References Cited by the Examiner

UNITED STATES PATENTS

| | | | |
|---|---|---|---|
| 2,470,716 | 5/1949 | Overbeck | 235—92 |
| 2,521,350 | 9/1950 | Dickinson | 235—92 |
| 2,584,363 | 2/1952 | Mumma | 235—92 |
| 2,935,255 | 5/1960 | Reiner | 235—92 |

ROBERT C. BAILEY, *Primary Examiner.*

MALCOLM A. MORRISON, *Examiner.*

E. RONEY, I. S. KAVRUKOV, *Assistant Examiners.*